(12) United States Patent
Futch et al.

(10) Patent No.: US 12,169,402 B2
(45) Date of Patent: Dec. 17, 2024

(54) PARCEL AND ARTICLE SORTING SYSTEM AND METHOD WITH DESTINATION CONTAINER REMOVAL

(71) Applicant: Tompkins Robotics, Inc., Orlando, FL (US)

(72) Inventors: Michael C. Futch, Orlando, FL (US); James M. Serstad, Orlando, FL (US)

( * ) Notice: Subject to any disclaimer, the term of this patent is extended or adjusted under 35 U.S.C. 154(b) by 0 days.

(21) Appl. No.: 18/167,918

(22) Filed: Feb. 13, 2023

(65) Prior Publication Data

US 2023/0185293 A1 Jun. 15, 2023

Related U.S. Application Data

(63) Continuation of application No. 17/340,139, filed on Jun. 7, 2021, now Pat. No. 11,586,187, which is a (Continued)

(51) Int. Cl.
*G05B 19/418* (2006.01)
*B07C 3/00* (2006.01)
(Continued)

(52) U.S. Cl.
CPC .......... *G05B 19/41895* (2013.01); *B07C 3/00* (2013.01); *B07C 3/008* (2013.01); (Continued)

(58) Field of Classification Search
CPC ..... G05B 19/41895; B07C 3/00; B07C 3/008; B07C 3/02; B07C 3/10; B07C 3/18; (Continued)

(56) References Cited

U.S. PATENT DOCUMENTS 4,861,018 A 8/1989 Kerstein
5,875,434 A 2/1999 Matsuoka et al.
(Continued)

FOREIGN PATENT DOCUMENTS

CN 104525488 A 4/2015
CN 105292892 A 2/2016
(Continued)

OTHER PUBLICATIONS

EPO, Extended European Search Report for EP Patent Application No. 18764345.7, mailed Apr. 21, 2021, 9 pages.
(Continued)

*Primary Examiner* — Thomas Randazzo
(74) *Attorney, Agent, or Firm* — Parthiban A Mathavan

(57) ABSTRACT

System includes an article supply location that includes a plurality of articles to be sorted, first and second transport vehicles, each having a first position in which an article is stowed about the vehicle and a second position in which the article is deposited into a proximal container, and one or more removal devices that transport the container to a location of further processing. System further includes a control system configured to receive an order for a plurality of disparate articles, determine one destination container of a plurality of destination containers to direct the transport vehicle to deposit a selected article, direct the first transport vehicle to transport a selected article to the destination container, deposit the article in the destination container, and transport the destination container to a location for further processing by manipulation of the removal device.

20 Claims, 5 Drawing Sheets

Related U.S. Application Data continuation of application No. 16/552,671, filed on Aug. 27, 2019, now abandoned.

(60) Provisional application No. 62/727,619, filed on Sep. 6, 2018.

(51) Int. Cl.
| | |
|---|---|
| *B07C 3/02* | (2006.01) |
| *B07C 3/10* | (2006.01) |
| *B07C 3/18* | (2006.01) |
| *B65G 1/06* | (2006.01) |
| *B65G 1/137* | (2006.01) |
| *B66F 9/06* | (2006.01) |
| *G06Q 10/08* | (2024.01) |

(52) U.S. Cl.
CPC .............. *B07C 3/02* (2013.01); *B07C 3/10* (2013.01); *B07C 3/18* (2013.01); *B65G 1/065* (2013.01); *B65G 1/137* (2013.01); *B65G 1/1373* (2013.01); *B66F 9/063* (2013.01); *G06Q 10/08* (2013.01); *B07C 2501/0063* (2013.01); *B65G 2201/0285* (2013.01)

(58) Field of Classification Search
CPC ... B07C 2501/0063; B07C 5/36; B65G 1/065; B65G 1/137; B65G 1/1373; B65G 2201/0285; B65G 1/1378; B66F 9/063; G06Q 10/08
See application file for complete search history.

(56) References Cited

U.S. PATENT DOCUMENTS

| | | | | |
|---|---|---|---|---|
| 6,079,570 | A * | 6/2000 | Oppliger | B07C 3/02 |
| | | | | 209/706 |
| 6,234,737 | B1 * | 5/2001 | Young | B25J 5/02 |
| | | | | 414/277 |
| 6,600,418 | B2 | 7/2003 | Francis et al. | |
| 6,775,588 | B1 | 8/2004 | Peck | |
| 7,038,573 | B2 | 5/2006 | Bann | |
| 7,119,689 | B2 | 10/2006 | Mallett et al. | |
| 7,221,276 | B2 | 5/2007 | Olsen, III et al. | |
| 7,246,706 | B1 * | 7/2007 | Shakes | B07C 7/02 |
| | | | | 209/614 |
| 7,597,187 | B2 | 10/2009 | Bausenwein et al. | |
| 8,442,266 | B2 | 5/2013 | Berger et al. | |
| 8,515,575 | B2 | 8/2013 | Pfeiffer | |
| 8,731,708 | B2 | 5/2014 | Shakes et al. | |
| 8,952,284 | B1 * | 2/2015 | Wong | G05B 15/02 |
| | | | | 209/586 |
| 9,152,149 | B1 | 10/2015 | Palamarchuk et al. | |
| 9,187,268 | B2 | 11/2015 | Denninger et al. | |
| 9,499,346 | B2 | 11/2016 | Triesenberg, III et al. | |
| 9,519,882 | B2 | 12/2016 | Galluzzo et al. | |
| 9,555,978 | B1 * | 1/2017 | Hanssen | B65G 1/1378 |
| 9,611,107 | B2 | 4/2017 | Wernersbach et al. | |
| 9,646,369 | B2 | 5/2017 | Salzman et al. | |
| 9,656,804 | B2 | 5/2017 | Lyon et al. | |
| 9,751,693 | B1 * | 9/2017 | Battles | B25J 9/0084 |
| 9,914,586 | B2 | 3/2018 | Zhu et al. | |
| 9,975,148 | B2 | 5/2018 | Zhu et al. | |
| 11,586,187 | B2 * | 2/2023 | Futch | B07C 3/10 |
| 2002/0018706 | A1 * | 2/2002 | Young | B65G 1/0407 |
| | | | | 414/790 |
| 2005/0047895 | A1 | 3/2005 | Lert | |
| 2007/0062851 | A1 | 3/2007 | Schulz et al. | |
| 2007/0227952 | A1 | 10/2007 | Zimmermann | |
| 2009/0010741 | A1 | 1/2009 | Burgstaller et al. | |
| 2009/0283453 | A1 * | 11/2009 | Bowers | B07C 3/00 |
| | | | | 209/551 |
| 2010/0025309 | A1 | 2/2010 | Burns et al. | |
| 2010/0036521 | A1 | 2/2010 | Schafer | |
| 2010/0300048 | A1 | 12/2010 | Krizmanic et al. | |
| 2013/0054005 | A1 * | 2/2013 | Stevens | G06Q 10/087 |
| | | | | 700/216 |
| 2014/0100998 | A1 * | 4/2014 | Mountz | G06Q 10/08 |
| | | | | 705/28 |
| 2014/0277691 | A1 * | 9/2014 | Jacobus | B66F 9/24 |
| | | | | 700/216 |
| 2015/0081090 | A1 * | 3/2015 | Dong | G06T 19/20 |
| | | | | 700/230 |
| 2017/0174432 | A1 * | 6/2017 | Zhu | B65G 1/06 |
| 2017/0183158 | A1 * | 6/2017 | Zhu | B65G 1/06 |
| 2017/0260008 | A1 * | 9/2017 | DeWitt | B65G 43/08 |
| 2018/0085788 | A1 * | 3/2018 | Engel | B07C 1/025 |
| 2018/0148272 | A1 * | 5/2018 | Wagner | B65G 47/82 |
| 2018/0150793 | A1 * | 5/2018 | Lert, Jr. | B65G 1/1373 |
| 2018/0333749 | A1 * | 11/2018 | Wagner | B65G 47/28 |
| 2019/0022705 | A1 * | 1/2019 | Stopper | H01L 21/67763 |
| 2019/0226125 | A1 * | 7/2019 | Keh | D01G 11/00 |
| 2019/0270591 | A1 * | 9/2019 | Lert, Jr. | B65G 1/0435 |
| 2020/0095063 | A1 * | 3/2020 | Liu | B25J 9/162 |
| 2021/0114062 | A1 * | 4/2021 | Liu | B07C 3/00 |

FOREIGN PATENT DOCUMENTS

| | | |
|---|---|---|
| GB | 2494884 A | 3/2013 |
| JP | 2007534576 A | 11/2007 |

OTHER PUBLICATIONS

WIPO; International Preliminary Report on Patentability for International Patent Application No. PCT/US19/48286 dated Mar. 18, 2021, 15 pages.

WIPO; Written Opinion of the International Search Authority for International Patent Application No. PCT/US19/48286 dated Dec. 12, 2019, 13 pages.

EPO; Extended European Search Report for European Patent Application No. 19857248.9 dated Apr. 4, 2022, 10 pages.

ISA/KR; International Search Report for International Patent Application No. PCT/US2019/048286 dated Dec. 12, 2019, 4 pages.

* cited by examiner

PARCEL AND ARTICLE SORTING SYSTEM AND METHOD WITH DESTINATION CONTAINER REMOVAL

CROSS-REFERENCE TO RELATED APPLICATIONS

This application is a continuation of U.S. patent application Ser. No. 17/340,139 filed on Jun. 7, 2021, which claims priority to U.S. patent application Ser. No. 16/552,671 filed on Aug. 27, 2019, which claims priority to U.S. Provisional Patent Application No. 62/727,619 filed on Sep. 6, 2018, the entire contents of which are incorporated by reference herein.

TECHNICAL FIELD

The presently disclosed subject matter relates to handling of packages, and specifically to a parcel and article sorting system and method.

BACKGROUND

Parcel sorting includes dispensing packages going to different destinations through a delivery management system to realize unified transport of packages. This is especially advantageous in an order fulfillment center or shipping facility. Generally, a parcel or article for shipment will have a UPC, barcode, SKU, or similar identifier that allows for identification of the parcel and destination. Similarly, article sorting includes dispensing articles that come from a plurality of warehouse locations to different exits through a delivery management system. Unified consolidation at a single exit or destination point of all articles in a single order in a single article, package or parcel can thus be realized, such as in a parcel fulfilment center. The sorting process is labor intensive and often involves processing errors and erroneous package arrival times. Additionally, packages may be damaged or packaged incorrectly, which reduces efficiency for all involved parties. Automated sorting equipment can be used to address some of these issues. However, sorting equipment is costly, takes up large portions of warehouse space, is limited in the volume of packages that can be sorted, is significantly underutilized at less than peak periods, and can have a long payback time frame.

Accordingly, opportunities exist for provision of an improved sorting system for parcels and articles.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In some embodiments, the presently disclosed subject matter is directed to system includes a first article supply location, wherein the first article supply location includes a plurality of articles to be sorted that have been pulled from batched orders from a first location in a distribution center. The system includes a second article supply location, wherein the second article supply location includes a plurality of articles to be sorted that have been pulled from batched orders from a second location in the distribution center. A product type of each article is determined by interacting with an information acquisition device at a respective first article supply location and second article supply location. The system includes first and second computer-controlled transport vehicles, each vehicle having a first position in which a selected article is stowed about the vehicle and a second position in which the selected article is deposited into a proximal container by manipulating a support of the vehicle that carries the selected article and deposits the selected article when in the second position. The system includes a first platform elevated from a first surface, wherein the first computer-controlled transport vehicle traverses the first platform and the selected articles are deposited into a destination container positioned about the first surface. The system includes a removal device configured to relocate a destination container from a position about the first surface to a location designated for further processing of at least one article contained within the destination container. The system includes a control system. The control system is configured to receive an order for a plurality of disparate articles, wherein the disparate articles are found within the first or second article supply location after the articles have been pulled from the distribution center. The control system is configured to determine a first destination container of a plurality of destination containers to direct a first transport vehicle to deposit a selected article from the first or second article supply location based on a determined product type, wherein the first destination container corresponds with an order for a first business. The control system is configured to direct the first transport vehicle to transport the selected article to the first destination container and deposit the selected article by manipulation of the first transport vehicle from the first position to the second position for deposit of the selected article in the first destination container. The control system is configured to determine a second destination container of a plurality of destination containers to direct a second transport vehicle to deposit another article from the first or second article supply location based on a determined product type, wherein the second destination container corresponds with an order for a second business. The control system is configured to direct the second transport vehicle to transport a disparate article to the second destination container and deposit the disparate article by manipulation of the second transport vehicle from the first position to the second position for deposit of the disparate article in the second destination container. The control system is configured to determine a location that the destination container is to be delivered to for further processing of at least one article in the destination container. The control system is configured to determine when all of the articles required to complete at least one of the orders has been deposited in the destination container. The control system is configured to direct the removal device to remove the destination container from the position proximal to the platform and transport it to the location of further processing.

According to one or more embodiments, the control system is configured to indicate when the destination container is full or when the destination container has been removed whereby the control system directs at least one of the first and the second transport vehicles to cease delivery of articles to a removed destination container location. The control system is further configured to indicate when an empty destination container is positioned proximal to the platform whereby the control system directs the at least one of the first and the second transport vehicles to resume delivery of articles to the empty destination container.

According to one or more embodiments, the removal device is configured to replace destination containers that are full or that contain complete orders with empty destination containers.

According to one or more embodiments, the location of further processing comprises one or more of packaging, gift wrapping, labeling, and assembly.

According to one or more embodiments, the removal device is fully automated or semi-automated.

According to one or more embodiments, the removal device is one of an automatic guided vehicle, an automated mobile robot, and a rail robot.

According to one or more embodiments, the system comprises a plurality of locations of further processing.

According to one or more embodiments, the determined product type of the selected article or the disparate article is determined by interacting with an identifier of the selected article or the disparate article with the information acquisition device, wherein the identifier is a UPC or other product code associated with the selected article or the disparate article.

According to one or more embodiments, the destination container is positioned proximal an opening in the first platform, wherein the control system is further configured to direct the first transport vehicle to traverse the first platform proximal the opening, then manipulate from the first position to the second position to deposit the selected article or the disparate article into the destination container through the opening in the first platform.

According to one or more embodiments, each of the first transport vehicle and the second transport vehicle is configured to carry a respective single selected article at a time.

According to one or more embodiments, the system further includes a plurality of additional transport vehicles.

According to one or more embodiments, the control system is further configured to direct the first transport vehicle to return to a position proximal the first article supply location, wherein the first transport vehicle is configured to be in the first position upon being positioned proximal the first article supply location.

According to one or more embodiments, the control system is configured to direct a plurality of additional transport vehicles, wherein the control system is further configured to direct the plurality of additional transport vehicles such that the plurality of additional transport vehicles does not collide with one another.

According to one or more embodiments, the control system is configured to direct a plurality of additional removal devices, wherein the control system is further configured to direct the plurality of additional removal devices such that the plurality of additional removal devices does not collide with one another.

Disclosed herein is control system configured for use with material handling of a plurality of articles. The control system comprising a memory and a processor. The control system configured to receive a plurality of orders for a plurality of disparate articles. The control system configured to batch the plurality of orders over a period of time, wherein the plurality of disparate articles are received from a first article supply location that has been pulled from batched orders from a first location in a distribution center and from a second article supply location that has been pulled from batched orders from a second location in the distribution center. The control system configured to interact with an identifier affixed to a selected article or packaging associated with the selected article to determine a product type of the selected article at the first article supply location or the second article supply location. The control system configured to determine one destination container of a plurality of destination containers to deposit, with a transport vehicle, the selected article, wherein the destination container is determined based on at least one of the orders and a determined product type of the selected article. The control system configured to direct a first transport vehicle to transport the selected article to the one destination container and deposit the selected article by manipulation of the first transport vehicle from a first position to a second position for deposit of the selected article in the one destination container. The control system configured to determine another destination container of a plurality of destination containers to deposit, with a transport vehicle, a disparate selected article, wherein the another destination container is determined based on at least one of the orders and a determined product type of the disparate selected article. The control system configured to direct a second transport vehicle to transport the disparate selected article to the another destination container and deposit the disparate selected article by manipulation of the second transport vehicle from the first position to the second position for deposit of the disparate selected article in the another destination container. The control system configured to determine a location that the destination container is to be delivered to for further processing of at least one article in the destination container. The control system configured to determine when all of the articles required to complete at least one order have been deposited into the destination container. The control system configured to direct a removal device to remove the destination container from a position proximal to a platform and transport it to the location of further processing.

Disclosed herein is a system. The system includes a first article supply location, wherein the first article supply location includes a plurality of articles to be sorted that have been pulled from batched orders from a first location in a distribution center. The system includes a second article supply location, wherein the second article supply location includes a plurality of articles to be sorted that have been pulled from batched orders from a second location in the distribution center. A product type of each article is determined by interacting with an information acquisition device at a respective first article supply location and second article supply location. The system includes a platform assembly that includes a platform elevated from a proximal surface, wherein the platform defines an opening and a destination container that is positioned proximal the opening in the platform or proximal a location at an edge of the platform. The system includes first and second computer-controlled transport vehicles, each transport vehicle having a first position in which a selected article is stowed about a transport vehicle and a second position in which the selected article is deposited into a proximal container by manipulating a support of the vehicle that carried the selected article and deposits the selected article when in the second position. Each transport vehicle traverses the platform and positions proximal the opening to deposit the selected article in the destination container by manipulation from the first position to the second position. The system includes a removal device configured to relocate the destination container from a position about the proximal surface to a location designated for further processing of at least one articles contained within a designation container. The system includes a control system. The control system is configured to receive an order for a plurality of disparate articles, wherein the disparate articles are found within the first and second article supply location after the articles have been sorted and pulled at the distribution center. The control system is configured to determine a first destination container of a plurality of receiving destination containers to direct a first transport vehicle to deposit the selected article from the first or second article supply location based on a determined product type, wherein the first destination container corresponds with an order for a first business. The control system is configured to direct the first transport vehicle to transport the selected article to the first destination container and deposit the selected article by manipulation of the support of the first transport vehicle from the first position to the second position for deposit of the selected article in the first destination container. The control system is configured to determine a second destination container of a plurality of destination containers to direct a second transport vehicle to deposit a disparate selected article from the first or second article supply location based on a determined product type, wherein the second destination container corresponds with an order for a second business. The control system is configured to direct the second transport vehicle to transport the disparate selected article to the destination container and deposit the disparate selected article by manipulation of the support of the second transport vehicle from the first position to the second position for deposit of the disparate selected article in the destination container. The control system is configured to determine when all articles required to complete at least one order for purchase have been deposited in the destination container. The control system is configured to determine a location that the destination container is to be delivered to for further processing of at least one article in the container. The control system is configured to direct the removal device to remove the destination container from the position proximal to the platform and transport it to the location of further processing.

According to one or more embodiments, the location of further processing comprises one or more of packaging, gift wrapping, labeling, and assembly.

According to one or more embodiments, the system comprises a plurality of locations of further processing.

According to one or more embodiments, the control system is further configured to determine a characteristic of an article by the information acquisition device interacting with the article, wherein the characteristic includes one of size, color, deformation or other defect of the article.

According to one or more embodiments, the determined product type of the selected article or the disparate selected article is determined by the information acquisition device interacting with an identifier of the selected article or the disparate selected article, wherein the identifier is a UPC code (Universal Product Code) or other product code associated with the selected article or the disparate selected article.

According to one or more embodiments, the control system is configured to direct the first transport vehicle to return to a position proximal the first article supply location, wherein the first transport vehicle is configured to be in the first position upon being positioned proximal the first article supply location.

According to one or more embodiments, the control system is configured to direct a plurality of additional transport vehicles, wherein the control system is further configured to direct the plurality of additional transport vehicles such that the plurality of additional transport vehicles does not collide with one another.

Disclosed herein is a system. According to various embodiments, the system comprises: an article supply location; a computer-controlled transport vehicle; a removal device configured to relocate a destination container to a processing location designated for further processing of at least one article contained within the destination container; and a control system. The control system configured to: determine a destination container to direct the transport vehicle to deposit a selected article from the article supply location, wherein the destination container corresponds with a customer order; direct the transport vehicle to transport the selected article to the destination container and deposit the selected article by manipulation of the transport vehicle from a first position to a second position for deposit of the selected article in the destination container; determine a processing location that the destination container is to be delivered to for further processing of at least one article in the destination container; and, direct the removal device to transport the destination container to the processing location for further processing.

Disclosed herein is a system. According to various embodiments, the system comprises: an article supply location, wherein the article supply location includes a plurality of articles to be sorted that have been pulled from batched orders from a location in a distribution center; a computer-controlled transport vehicle having a first position in which a selected article is stowed about the vehicle and a second position in which the selected article is deposited into a proximal container by manipulating a support of the vehicle that carries the selected article and deposits the selected article when in the second position; a removal device configured to relocate a destination container to a processing location designated for further processing of at least one article contained within the destination container; and, a control system. The control system configured to: receive an order for a plurality of disparate articles, wherein the disparate articles are found within the article supply location after the articles have been pulled from the distribution center; determine a destination container to direct the transport vehicle to deposit a selected article from the article supply location, wherein the destination container corresponds with a shipping order; direct the transport vehicle to transport the selected article to the destination container and deposit the selected article by manipulation of the transport vehicle from the first position to the second position for deposit of the selected article in the destination container; determine a processing location that the destination container is to be delivered to for further processing of at least one article in the destination container; and, direct the removal device to transport the destination container to the processing location for further processing.

Disclosed herein is a system. According to various embodiments, the system comprises: an article supply location, wherein the article supply location includes a plurality of articles to be sorted that have been pulled from batched orders from a location in a distribution center; wherein a product type of each article is determined by interacting with an information acquisition device at the first article supply location; a computer-controlled transport vehicle having a first position in which a selected article is stowed about the vehicle and a second position in which the selected article is deposited into a proximal container by manipulating a support of the vehicle that carries the selected article and deposits the selected article when in the second position; a removal device configured to relocate a destination container from a filling location to a processing location designated for further processing of at least one article contained within the destination container; and, a control system. The control system is configured to: receive an order for a plurality of disparate articles, wherein the disparate articles are found within the article supply location after the articles have been pulled from the distribution center; determine a destination container of a plurality of destination containers to direct a transport vehicle to deposit a selected article from the article supply location based on a determined product type, wherein the destination container corresponds with an order for a first business; direct the transport vehicle to transport the selected article to the destination container and deposit the selected article by manipulation of the transport vehicle from the first position to the second position for deposit of the selected article in the destination container; determine a processing location that the destination container is to be delivered to for further processing of at least one article in the destination container; determine when all of the articles required to complete at least one of the orders has been deposited in the destination container; and, direct the removal device to remove the destination container from the filling location and transport it to the processing location of further processing.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Below, the technical solutions set forth in the examples are depicted clearly and comprehensively with reference to the figures. It should be appreciated that the examples depicted herein are not limited to each and every embodiment of the presently disclosed subject matter. In general, the components in the disclosed examples and shown in the figures herein can be arranged and designed according to different configurations. Thus, detailed description of the examples of the present invention provided in the figures below are not intended to limit the scope of the presently disclosed subject matter as claimed, but merely represent selected examples. On the basis of the examples below, other examples that could be obtained by a person skilled in the art without using inventive efforts will fall within the scope of the presently disclosed subject matter.

Example 1

Figure 1:
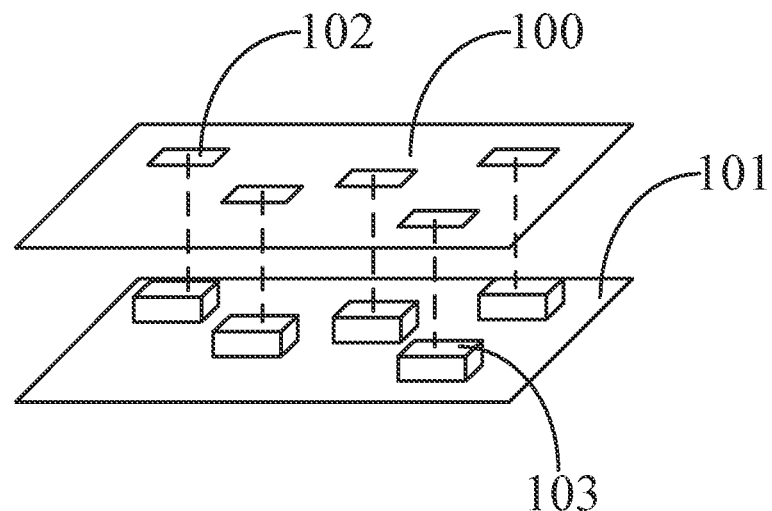
FIG. 1 is a structural schematic diagram of a sorting system provided in accordance with some embodiments of the presently disclosed subject matter.

According to Example 1, the presently disclosed subject matter is directed to a parcel sorting system, as shown in FIG. 1. The parcel sorting system includes a parcel sorting device 100 and a parcel collecting device 101. The parcel sorting device 100 is provided on the parcel collecting device with a plurality of parcel checking inlets 104 and a plurality of parcel outlets 102. In one embodiment, the parcel collecting device 101 is located just below the parcel sorting device 100, as illustrated in FIG. 1. The plurality of parcel outlets 102 on the parcel sorting device 100 are respectively in communication or connected with the parcel collecting device 101. The plurality of parcel outlets 102 are respectively located at the middle or/and edges of the parcel sorting device 100, or throughout the parcel sorting device 100. Parcel collecting device 101 is provided thereon with storage devices 103. One storage device is located at each of positions of the parcel outlets, and an opening diameter of the storage device 103 is greater than a diameter of the parcel outlet 102. In some embodiment, an opening perimeter of storage device 103 is greater than a perimeter of parcel outlet 102.

Parcel sorting device 100 and the parcel collecting device 101 can be embodied in various structures such as, for example, quadrangle, circle, polygon and similar other structures, and the parcel collecting device 101 and the parcel sorting device 100 preferably have substantially the same area.

Figure 2:
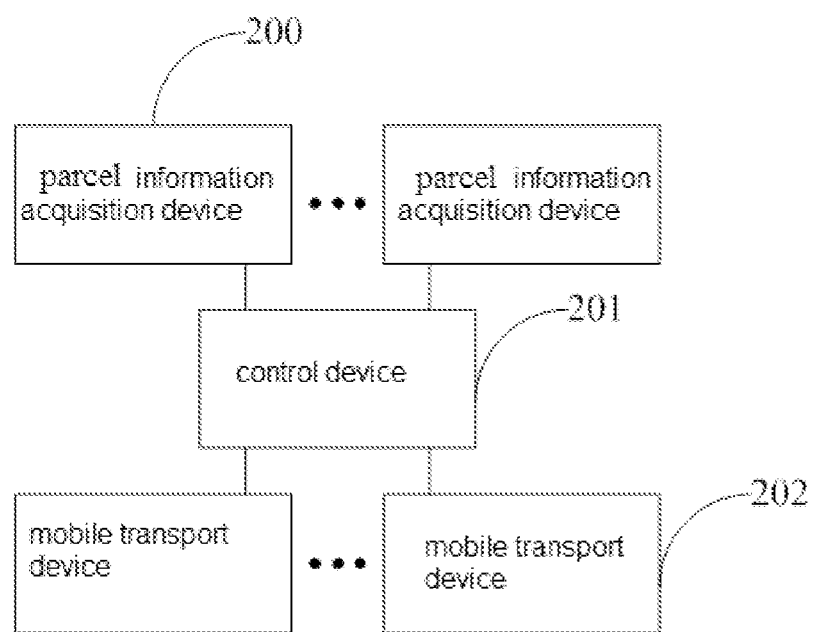
FIG. 2 is a block diagram of the sorting system provided in accordance with some embodiments of the presently disclosed subject matter.
Figure 3:
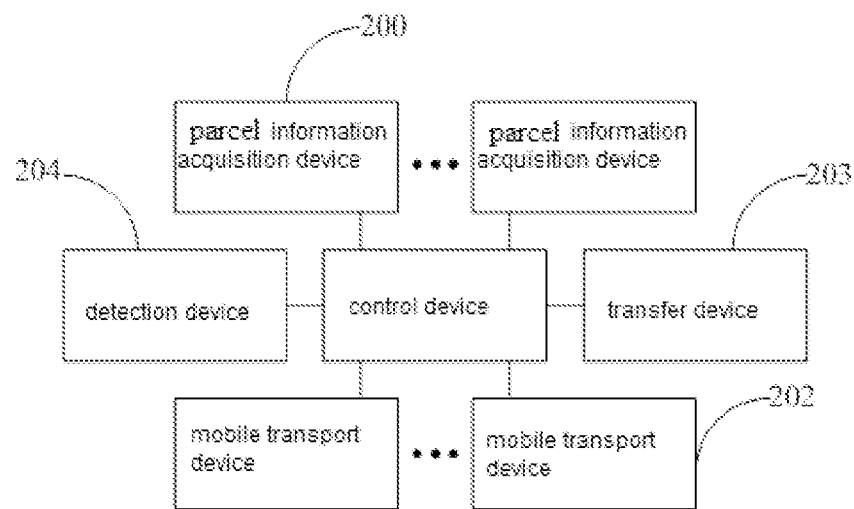
FIG. 3 is a block diagram of a sorting system provided in accordance with some embodiments of the presently disclosed subject matter.

In order to improve the parcel sorting efficiency, each of the parcel checking inlets 104 ((see FIG. 4) is provided with one parcel information acquisition device 200 (see FIGS. 2 and 3). Parcel checking inlets 104 can be in one-to-one correspondence with parcel information acquisition devices 200. Further, parcel information acquisition devices 200 are configured to acquire parcel information of the parcels to be sorted that enter the parcel checking inlets 104 associated with each of the parcel information acquisition devices 200. The parcel information contains destinations of the parcels to be sorted.

Figure 4:
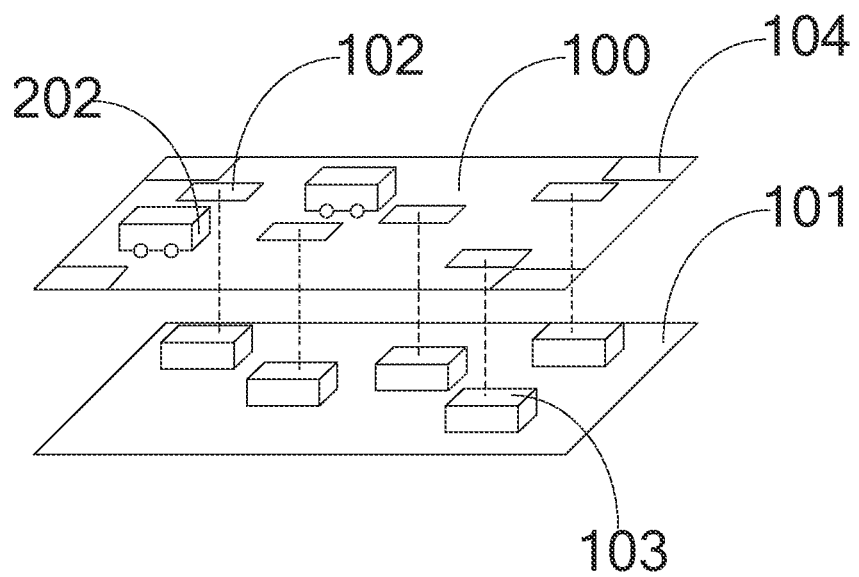
FIG. 4 is a structural schematic diagram of a sorting system provided in accordance with some embodiments of the presently disclosed subject matter.

A plurality of parcel checking inlets 104 are provided as shown, for example, in FIG. 4. Each parcel checking inlet 104 is provided with a parcel information acquisition device 200 such that the information acquisition and sorting of the plurality of parcels to be sorted may be performed simultaneously at the plurality of parcel checking inlets 104. This can significantly increase the parcel information acquisition efficiency, thereby improving the parcel sorting efficiency.

In the above, there are many ways in which parcel information acquisition devices 200 can acquire the parcel information of the parcels to be sorted. For example, in some embodiments, the destination information is carried in a destination address information code provided on the parcel to be sorted. Each of the parcel information acquisition devices 200 can include a scanner configured to scan the information code for obtaining the destination of the parcel to be sorted. In various embodiments, the parcels to be sorted are provided with information codes thereon containing destination information. Parcel information acquisition devices 200 obtain the destinations of the parcels to be sorted by scanning the information codes, wherein the information code may be a bar code, a two-dimensional code, a radio frequency tag, or similar other code or tag. Correspondingly, parcel information acquisition device 200 may be a bar code scanner, a two-dimensional code scanner, a radio frequency identifier, or similar other corresponding device and the transport device 202 may be an auto-navigating small vehicle.

According to actual demands, in addition to the destination, the parcel information may further contain information about the parcel volume, weight, and/or similar other information. Correspondingly, the parcel information acquisition device 200 may further include a weighing device, a volume scanner, or a similar other corresponding device.

While the parcel information is obtained in a highly efficient manner, to improve the efficiency of subsequent sorting (i.e., after the plurality of parcel information acquisition devices 200 have simultaneously acquired the parcel information of the respective parcels to be sorted), control system 201 (see FIG. 2) is used to complete the analytical processing of the obtained parcel information of all the parcels to be sorted by obtaining the destination information of the respective parcels to be sorted. Accordingly, the system can further include control system 201 in connection with all parcel information acquisition devices 200, control system 201 operable to obtain the parcel information acquired by all the parcel information acquisition devices 200, to thereby obtain the destinations of the respective parcels to be sorted.

After obtaining the parcel information, to improve the efficiency of the subsequent sorting processes, the system preferably further includes a plurality of transport devices 202, wherein the plurality of transport devices 202 are in connection with the control system 201. Control system 201 is pre-provided with parcel outlets 102 respectively corresponding to different destinations and is further configured to control (according to the obtained destinations of the parcels to be sorted) at least one of the transport devices 202 to transport the parcels to be sorted to the parcel outlets 102 corresponding to the destinations of the parcels to be sorted, as shown, for example, in FIG. 2.

After control system 201 has already obtained the destinations of the respective parcels to be sorted at the respective parcel checking inlets 104, the parcel sorting can be completed just by obtaining the transport paths of the respective parcels to be sorted through analysis according to the position of a respective parcel outlet 102 that corresponds to the destination of a respective parcel to be sorted. Control system 201 can then control at least one of the transport devices 202 to transport, according to the transport paths, each parcel to be sorted to the respective parcel outlet 102 corresponding to the destination of the parcel to be sorted.

In various embodiments, the analysis by control system 201 on the transport paths of the respective parcels to be sorted can be performed simultaneous to receiving the destinations of the respective parcels. After the path analysis is completed, the plurality of transport devices 202 may be simultaneously controlled by control system 201 to simultaneously complete transporting of the individual parcels to be sorted by the transport devices 202, thereby significantly improving the parcel sorting efficiency.

Each of the transport devices 202 is configured to load one parcel to be sorted or a plurality of parcels to be sorted that go to the same destination. In some embodiments, transport device 202 is configured to transport one parcel to be sorted one time. Control system 201 sends a control instruction to a particular transport device 202 after obtaining the destination of the parcel to be sorted that is going to be transported by that particular transport device 202, such that the transport device 202 travels to the position of the parcel outlet 102 corresponding to the destination of the parcel to be sorted.

In some embodiments, parcels to be sorted may be manually loaded onto transport devices 202. In other embodiments, the parcels to be sorted may be automatically loaded onto transport devices 202 by intelligently controlling parcel gripping devices or the like via control system 201. Similarly, in some embodiments, the transport of the parcels to be sorted from parcel outlets 102 to parcel collecting device 101 can be performed manually, and may also be completed by intelligently controlling parcel gripping devices or the like through the control system 201.

To assure that the respective parcels to be sorted that are transported to the parcel collecting device 101 can be delivered in time, the system can further include a detection device 204 and a transfer device 203 (see FIG.). Detection device 204 is configured to detect whether a storage device 103 is full or not and to transmit to control system 201 the obtained information regarding whether the storage device 103 is full or not. Transfer device 203 is configured to transfer storage device 103 which is full according to an instruction from control system 201. There are many options for transfer device 203; for example, transfer device 203 can be an intelligent robot in one embodiment. In another example, storage device 103 can mounted on transfer device 203, with transfer device 203 in the form of a large-scale auto-navigating vehicle, the transfer device 203 moving to a position to load and unload the parcels according to the control instruction of the control system 201, as shown in FIGS. 3 and 4.

Based on the above-mentioned system architecture, additional examples of the present invention are implemented as set forth below.

In various embodiments, the respective transport devices, such as a forklift, transport the parcels to be sorted to the respective parcel checking inlets 104. The parcel information acquisition devices 200 at the respective parcel checking inlets 104 acquire the parcel information of the respective parcels and transmit the acquired parcel information to control system 201. Control system 201 performs simultaneous analysis on the parcel information of the plurality of parcels to be sorted to obtain the destinations of the respective parcels and the parcel outlets 102 corresponding to the respective destinations. Control system 201 further controls the plurality of transport devices 202 to simultaneously transport the respective parcels to be sorted to the corresponding parcel outlets 102. The parcels to be sorted are delivered from parcel outlets 102 into storage devices 103 on parcel collecting device 101 located below, and then are moved away from parcel outlets 102 according to a control instruction of the control system 201 and wait for further instructions. The processes above are repeated until all of the parcels to be sorted are delivered into storage devices 103. In the meantime, detection device 204 constantly detects whether there is a storage device 103 that is full of parcels. When there is a storage device 103 full of parcels, control system 201 controls transfer device 203 to transfer the storage device 103 that is full and placing an empty storage device 103 at the position where the transferred storage device 103 was, until sorting of all the parcels to be sorted is completed. In some embodiments, the replacement of the full storage device 103 with an empty storage device 103 could also be performed by a person.

The parcel sorting system according to one or more embodiments of the presently disclosed subject matter can make full use of the area of parcel sorting device 100, increasing a plurality of effective parcel outlets 102 and can solve the traditional problem of goods accumulation. Checking efficiency can thereby be greatly increased to make the whole operation flow of the parcel sorting more systematic and intelligent. A "double" structure is creatively adopted, with parcel sorting device 100 and parcel collecting device 101 being arranged one above the other for sorting parcels. Parcel outlets 102 on parcel sorting device 100 are in communication with or positioned in alignment with parcel collecting device 101. During parcel sorting, the parcels to be sorted can enter parcel collecting device 101 arranged below just by passing through the parcel outlets 102, thereby completing the sorting. Such a structural design can ensure that parcel outlets 102 can be flexibly arranged on the edges of the parcel sorting device 100 or at middle positions of the edges, rather than only being provided at the edges of the parcel sorting device 100 as set forth in a typical existing installation. The middle position mentioned in the disclosed examples refers to positions on the parcel sorting device 100 other than the edges. The utilization ratio of the parcel sorting device 100 can be efficiently improved, the transport path for parcel sorting can be shortened, the parcel sorting efficiency can be increased, and the design can be beneficial.

Example 2

Figure 5:
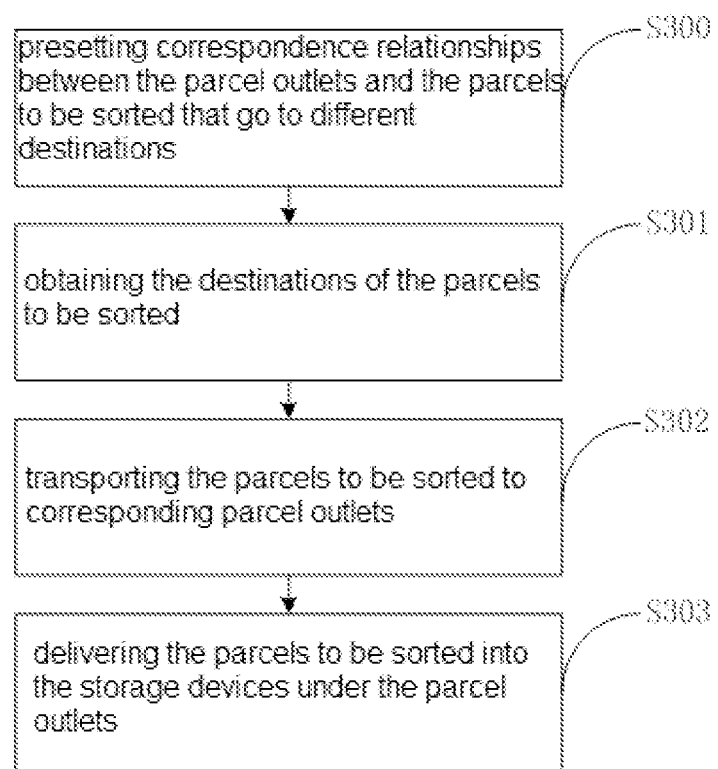
FIG. 5 is a schematic flow diagram for sorting system in accordance with some embodiments of the presently disclosed subject matter.

According to Example 2, FIG. 5 illustrates one example of a disclosed parcel sorting method that is applied to a parcel sorting system. The parcel sorting system comprises a parcel sorting device and a parcel collecting device. The parcel sorting device is provided with a plurality of parcel checking inlets and a plurality of parcel outlets. The parcel collecting device is located just below the parcel sorting device. Each of the plurality of parcel outlets on the parcel sorting device is respectively in communication with the parcel collecting device. The parcel outlets are respectively located at the middle and/or edges of the parcel sorting device, and the parcel collecting device is respectively provided thereon with storage devices. One storage device is located at each position of the parcel outlets, and an opening diameter of the storage device is greater than a diameter of the parcel outlet.

The method includes step S300: presetting correspondence relationships between the parcel outlets and the parcels to be sorted that go to different destinations; Step S301: obtaining the destinations of the parcels to be sorted; Step S302: transporting the parcels to be sorted to the parcel outlets corresponding to the destinations of the parcels to be sorted; and, Step S303: delivering, through the parcel outlets, the parcels to be sorted into the storage devices under the parcel outlets.

To improve the efficiency of parcel sorting, each of the parcel checking inlets can be provided with a parcel information acquisition device. The parcel checking inlets may be in one-to-one correspondence with the parcel information acquisition devices. Obtaining the destinations of the parcels to be sorted includes acquiring, by the respective parcel information acquisition devices, the parcel information of the parcels to be sorted that enter the parcel checking inlets corresponding to the parcel information acquisition devices, with the parcel information containing the destinations of the parcels to be sorted.

There are many manners for the parcel information acquisition devices to acquire the parcel information on the parcels to be sorted. For example, the destination information is carried in a destination address information code provided on the parcel to be sorted. Each of the parcel information acquisition devices includes a scanner configured to scan the information code for obtaining the destination of the parcel to be sorted. For example, in one embodiment, the parcels to be sorted are provided thereon with information codes containing destination information of the parcels to be sorted. The parcel information acquisition devices obtain the destinations of the parcels to be sorted by scanning the information codes on the parcels to be sorted. The information code may be a bar code, a QR code, a RF tag or a similar other code or tag, and correspondingly, the parcel information acquisition device may be a bar code scanner, a two-dimensional code scanner, a radio frequency identifier, or a similar other corresponding code or tag reader. The transport device may be an auto-navigating small vehicle.

According to actual demands, in addition to the destination, the parcel information may further contain information about the parcel volume, weight, and/or similar other information. Correspondingly, the parcel information acquisition device may further include a weighing device, a volume scanner, or a similar other corresponding device.

According to various embodiments, while the parcel information is obtained in a highly-efficiently manner, to improve the efficiency of subsequent sorting, after the plurality of parcel information acquisition devices simultaneously acquire the parcel information of the respective parcels to be sorted, the control device is used to complete the analytical processing of the obtained parcel information of all the parcels to be sorted, thereby obtaining the destination information of the respective parcels. For example, the system can further include a control device and a plurality of transport devices, wherein the correspondence relationships between the parcel outlets and the parcels to be sorted that go to different destinations are preset in the control device. Transporting the parcels to be sorted to the parcel outlets corresponding to the destinations of the parcels to be sorted includes obtaining, by the control device, the parcel information acquired by all the parcel information acquisition devices to obtain the destinations of the respective parcels to be sorted; and, controlling at least one of the transport devices, according to the obtained destinations of the parcels to be sorted, to transport the parcels to be sorted to the parcel outlets corresponding to the destinations of the parcels to be sorted.

After obtaining the parcel information, to improve the efficiency of the subsequent sorting processes, the system can further include a detection device and a transfer device. The method can accordingly further include obtaining, by the control device, the information detected by the detection device about whether the storage device is full or not, and when obtaining information indicating that the storage device is full, transmitting to the transfer device an instruction for transferring the storage device that is full.

In various embodiments, the control device can previously be provided with the destinations of the respective parcels to be sorted at the respective parcel checking inlets. The parcel sorting can be completed just by obtaining the transport paths of the respective parcels to be sorted through analysis according to the positions of the parcel outlets corresponding to the destinations of the respective parcels to be sorted, and then controlling at least one of the transport devices to transport, according to the transport paths. The transport devices can then deposit each of the parcels to be sorted to the parcel outlets corresponding to the destinations of the parcels to be sorted.

In various embodiments, the analysis by the control device on the transport paths of the respective parcels to be sorted can be performed simultaneous to receiving the destinations of the respective parcels. After the path analysis is completed, the plurality of transport devices may be simultaneously controlled by the control device to simultaneously complete transporting of the respective parcels to be sorted, thereby significantly improving the parcel sorting efficiency.

Each of the transport devices is configured to load one parcel to be sorted or a plurality of parcels to be sorted that go to the same destination. In some embodiments, the transport device is configured to transport one parcel to be sorted one time. The control device sends a control instruction to the transport device after obtaining the destination of the parcel to be sorted that is going to be transported by the transport device that are mobile, such that the transport device travels to the position of the parcel outlet corresponding to the destination of the parcel to be sorted.

In various embodiments, the parcels to be sorted may be manually loaded onto the transport device. In other embodiments, the parcels to be sorted may be automatically loaded onto the transport devices by intelligently controlling parcel gripping devices or the like through the control device. Similarly, in some embodiments, the transport of the parcels to be sorted from the parcel outlets to the parcel collecting device can be performed manually and may also be completed by intelligently controlling parcel gripping devices or the like through the control device.

As to the methods provided in the disclosed examples, the implementation principles and the technical effects produced thereof are the same as or similar to those in the preceding examples regarding the systems. For brief description, as for contents not mentioned in the examples regarding the methods, reference can be made to the corresponding contents in the preceding examples regarding the systems.

Example 3

Figure 6:
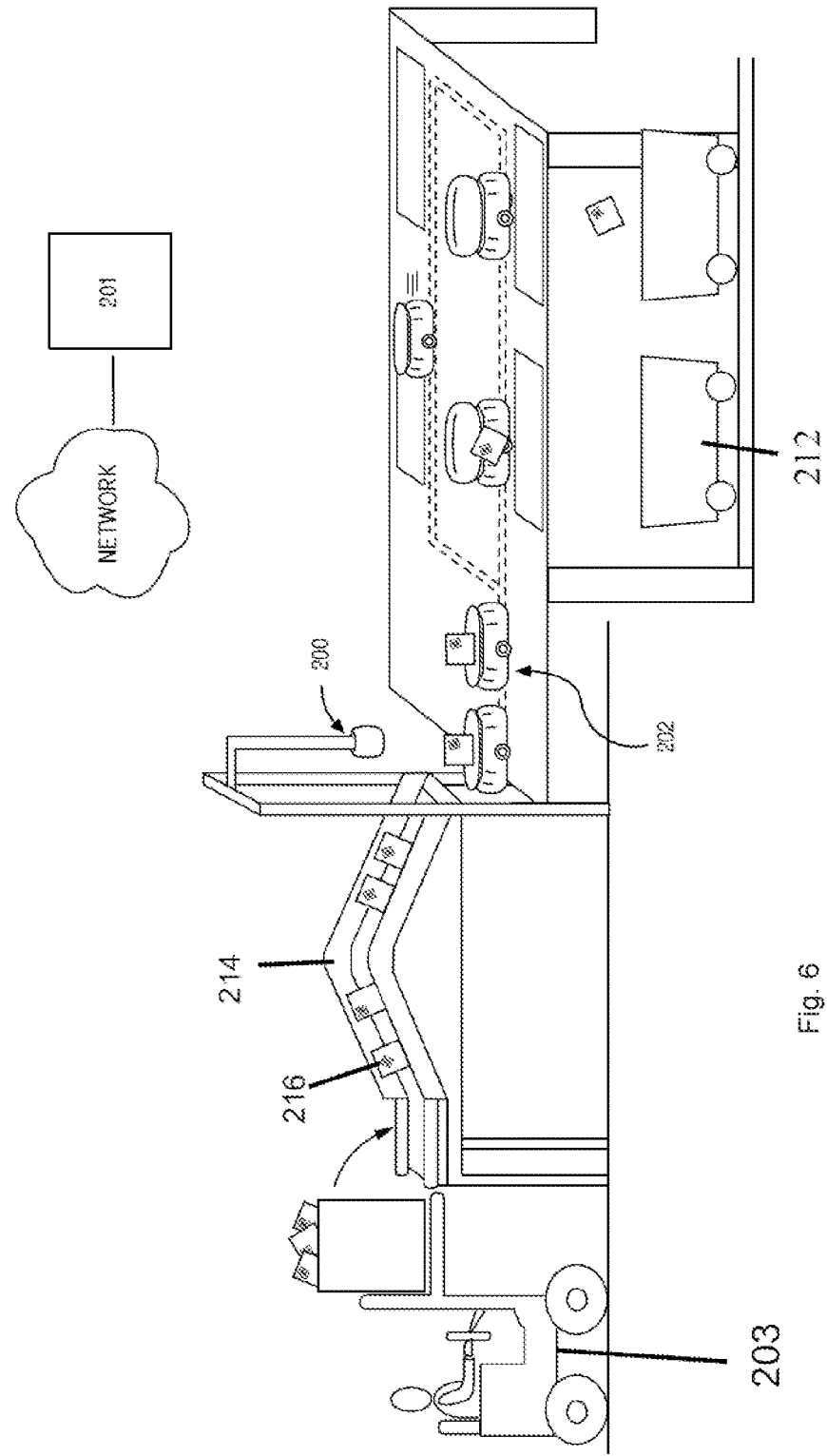
FIG. 6 is an illustration of a sorting system in accordance with some embodiments of the presently disclosed subject matter.

According to Example 3, as illustrated in FIG. 6, various embodiments of the presently disclosed subject matter are directed to a system for use in an order fulfillment center or any other facility that receives orders or listings of articles for an order. The system provides an improvement for sorting orders and packaging the same for fulfillment. The system includes a platform that is elevated proximal to a lower level, which in some embodiments may be a second platform. The platform provides a surface for transport vehicles 202 to traverse to deposit an article to a destination container 212. In operation, a device or conveyor delivers a container of articles proximal a chute 214 or other material handling system. The chute 214 or other material handling system delivers the container of articles to an article supply location. The container may contain products that are identical to each other or may be disparate products. The article supply, i.e., the articles shown in the containers, can be a supply of articles that has identifier 216 on each article. Parcel information acquisition devices 200 obtain the information contained in identifier 216 of the articles to be sorted by identifying the information codes present therein. The information code can be a bar code, a two-dimensional code, a radio frequency tag, or similar other code or tag, and correspondingly, the parcel information acquisition device 200 may be a bar code scanner, a two-dimensional code scanner, a radio frequency identifier, or similar other corresponding device. Additionally, the information acquisition device can be configured to image the article and compare against a database of known articles to determine a characteristic, SKU, or identity of the article.

An operator an select an article from the delivered container and image an identifier 216 positioned on the article via parcel information acquisition device 200. Optionally, parcel information acquisition device 200 can automatically interact with identifier 216 for article recognition without the need for any action on the part of the operator. The operator can place the article on the transport vehicle 202, or the system and process may be set up so that such deposition of article onto the transport vehicle 202 is automated. Parcel information acquisition device 200 can then communicate the article identifier information to control system 201 in communication with parcel information acquisition device 200 via the network.

Transport vehicle 202 may have a first position in which an article is stowed about the vehicle and a second position in which the article is deposited into a proximal destination container. In one or more embodiments, transport vehicle 202 can be an auto-navigating small vehicle.

Control system 201 is configured to determine one destination container 212 of a plurality of destination containers to deposit, with the transport vehicle 202, a selected article based on the interaction with identifier 216 present on the selected article. The control system 201 is further configured to direct the transport vehicle to transport the selected article to a specific destination container 212 and deposit the article by manipulation of the transport car from the first position to the second position for deposit of the selected article in the specific destination container 212.

In various embodiments, the system may be embodied in a multiple level arrangement. The multiple level arrangement can include an elevated platform above a lower level, wherein the lower level can be the floor or a second platform. In operation, the control device determines that a destination container needs an article deposited therein. In the multiple level arrangement, the destination container is positioned proximal an opening in the elevated platform. As directed by the system, the transport vehicle traverses the elevated platform to the destination container and deposits the article by manipulation of the transport vehicle from the first position to the second position for deposit of the selected article in the destination container.

As an illustrative example, consider a situation at an order fulfillment facility where an order calls for 3 red shirts, 2 blue shirts, and 2 pair of blue jeans to be transported to an end destination retailer. The control system 2011 may know that at article supply #1 has the red shirts, article supply #5 has the blue shirts, and article supply #13 has the blue jeans. The control system 201 proceeds to direct a respective transport vehicle 202 to each of article supply #1, article supply #5, and article supply #13. The control system 201 also determines or otherwise knows that the destination container for delivery of the order is located at a certain location on the platform. The control system 201 then directs each respective transport vehicle 202 to deposit articles into the destination container until the entire order is filled. When the order had been filed, control system 201 can then direct or otherwise instruct removal of the destination container.

The control system may be further configured to direct the transport vehicle to return to be proximally located at any article supply. The transport vehicle is in the first position upon being proximal to an article supply. The control system may be further configured to direct a plurality of transport vehicles such that the transport vehicles do not collide with one another.

Disclosed herein is thus a system that includes an article supply. The article supply includes a plurality of articles associated with an order fulfillment center. In operation, the system has a method or material handling system to move and transport containers of articles. The method or material handling system delivers a container of articles to an article supply location. The container may contain product that is identical or may be disparate product. Control system 201 communicates over a network. The network may be a wired or wireless network, such as Bluetooth®, WIFI, a specific Radio Frequency, cellular, and the like. Control system 201 may be embodied as a server with a processor and a memory, where the processor executes many instructions provided herein.

Control system 201 forming part of the control system may be configured to receive an order for a plurality of disparate articles to fulfill an order. The disparate articles may be a plurality of similar articles having different sizes, colors, and the like, such as apparel, or the disparate articles may be largely unrelated. Control system 201 can be configured to determine one destination container of a plurality of destination containers to deposit, with the transport vehicle, a selected article. Control system 201 can be configured to direct the transport vehicle to transport the selected article which is stowed about the vehicle to the destination container and deposit the article by manipulation of the transport vehicle from the first position to the second position for deposit of the selected article in the destination container. Control system 201 can be configured to direct the transport vehicle to transport a disparate article to the destination container and deposit the disparate article by manipulation of the transport vehicle from the first position to the second position for deposit of the selected disparate article in the destination container. Control system 201 may be configured to determine when the order is complete.

The control system as disclosed herein can include a parcel information acquisition device 200 that is configured to image the selected article. The control system may then be further configured to determine a characteristic of the selected article by interacting with the selected article with the information acquisition device. This interaction may include optical recognition to determine one or more characteristic of an article, including size, color, deformation or other defect, UPC or other identifying code, and the like. The control system can be further configured to determine a characteristic of the selected article by interacting with an identifier 216 of the selected article with the information acquisition device. The identifier may be a UPC or other similar other product code associated with the article.

The control system can further include an elevated platform above a lower level. The transport vehicle traverses the platform. The destination container is positioned proximal a recess in the platform. The transport vehicle traverses the platform, positions the vehicle proximal the recess and then manipulates from the first position to the second position to deposit the article. Each transport vehicle can carry a respective single selected article, and multiple transport vehicles may be traversing the platform at any given time. The control system can be configured to direct the transport vehicle to return to a position proximal an article supply. The transport vehicle is in the first position upon being proximal an article supply. The control system can be configured to direct a plurality of transport vehicles. The control system is further configured to direct the plurality of transport vehicles such that the transport vehicles do not collide with one another.

A method is also provided herein. The method can include receiving an order for a plurality of disparate articles; determining one destination container of a plurality of destination containers to direct the transport vehicle to deposit a selected article; and, directing the first transport vehicle to transport the selected article to the destination container and deposit the article by manipulation of the first transport vehicle from the first position to the second position for deposit of the selected article in the destination container. The method can further include directing the second transport vehicle to transport a disparate article to the destination container and deposit the disparate article by manipulation of the second transport vehicle from the first position to the second position for deposit of the selected disparate article in the destination container, and determining when all articles required to complete the order have been deposited in the destination container.

Example 4

According to Example 4, an additional example utilizing the same or many of the components discussed in regard to Example 3, a control system receives an order for fulfillment. The order, in this example, may include articles from various portions of a warehouse or fulfillment center. The control system batches the orders, thus allowing for multiple orders to be fulfilled at once in a time efficient manner.

The control system may then determine that a first plurality of articles to be sorted is located within a first portion of the fulfillment center, and a second plurality of articles to be sorted is located within a second portion of the fulfillment center, and the like. The pluralities of articles span the batched orders.

The control system may direct a person or an automated machine to pull the plurality of articles associated with the batched orders where the articles are in a first location of the fulfillment center. Those pulled articles in the first location may then be positioned in a case, bin, or other container. The control system may similarly direct a person or an automated machine to pull the plurality of articles associated with the batched orders where the articles are in a second location of the fulfillment center. The pulled articles in the second location may then be positioned into a separate case, bin, or other container. The bin or other container is then taken to a conveyor, chute, or the like to transport the pulled articles to a location of article supply. A person can then position an article from the pulled articles onto a transport vehicle, or an automated machine can then position the article onto the transport vehicle.

The information acquisition device can then image the UPC or other identifying code on the article to determine the article identity. The information acquisition device then communicates the article identity to the control system, which is then able to compare the article identity to the database of orders that have been batched and assign a destination container for depositing the article based on the orders. The control system does this for each article until the orders are filled.

The destination container can be positioned below the platform, where a chute may extend from the elevated platform to the destination container in order to guide the article into the destination container.

Example 5

According to Example 5, an additional example utilizing the same or many of the components discussed in regard to Example 3, a control system receives an order for store fulfillment. The order, in this example, may include articles from various portions of a warehouse or fulfillment center. The control system batches orders for stores, thus allowing for multiple store orders to be fulfilled at once in a time efficient manner.

The control system may then determine that a plurality of articles to be sorted is located within a first portion of the fulfillment center, and a second plurality of articles to be sorted is located within a second portion of the fulfillment center, and the like. The plurality of articles spans the store orders.

The control system may then direct a person or an automated machine to pull the plurality of articles associated with the stores orders where the articles are in the first portion of the fulfillment center. Those pulled articles in the first location may then be positioned in a case, bin or other container. Similarly, the pulled articles in the second location may then be positioned into a separate case, bin or other container. The bin or other container is then taken to a conveyor, chute, small vehicle, or the like to transport the pulled articles to a location of article supply. A person may then place an article onto a transport vehicle, or an automated machine may then place the article onto the transport vehicle.

The information acquisition device may then image the UPC or other identifying code on the article to determine the article identity. The information acquisition device then communicates the article identity to the control system which is then able to compare the article identity to the database of store orders that have been batched and assign a destination container for depositing the article based on the individual store. The control system then does this for each article until a store order is filled.

The control system may be further configured to segregate a store order into departments such that all articles for a given store department are assigned to a single destination container. Store departments may include or be defined as women's, men's, shoes, and similar other items.

The destination container may be positioned below the platform, where a chute may extend from the elevated platform to the destination container in order to guide the article into the destination container.

Example 6

According to Example 6, an additional example utilizing the same or many of the components discussed in regard to Example 3, an operation receives returns of articles from a customer. The returns arrive at a returns processing area and are received into the facility. In operation, a method, device or conveyor delivers a container of returned articles proximal a chute or other material handling system or method. The material handling system or method delivers the container of returned articles to an article supply location.

An operator may then place a single returned article onto a transport vehicle, or an automated machine may then place the article onto the transport vehicle.

The information acquisition device may then image the UPC or other identifying code on the article to determine the article identity. The information acquisition device then communicates the article identity to the control system is then able to compare the article identity to the database of the articles in the article master database and assign a destination container for depositing the article based on the article identity or SKU. The control system then does this for each article until all returned articles have been transported and deposited into destination containers. The control system can be configured to transport and deposit identical or similar articles into a single destination container.

The destination container may be positioned below the platform, where a chute may extend from the elevated platform to the destination container in order to guide the article into the destination container.

Example 7

According to Example 7, an additional example utilizing the same or many of the components discussed in regard to Example 3, a control system receives an order for fulfillment. The order can include articles from various portions of a warehouse or fulfillment center. The control system batches orders, thus allowing for multiple orders to be fulfilled at once in a time efficient manner. The control system can then determine that a plurality of articles to be sorted is located within a first portion of the fulfillment center, and a second plurality of articles to be sorted is located within a second portion of the fulfillment center, and the like. The plurality of articles spans the batched orders.

The control system can then direct a person or an automated machine to pull the plurality of articles associated with the batched orders where the articles are in the first portion of the fulfillment center. Those pulled articles in the first location may then be positioned in a case, bin, or other container. Similarly, the pulled articles in the second location may then be positioned into a separate case, bin, or other container. The bin or other container is then taken to a conveyor, chute, or the like to transport the pulled articles to a location of article supply. A person may then position an article onto a transport vehicle, or an automated machine may then position the article onto the transport vehicle.

The information acquisition device can then image the UPC or other identifying code on the article to determine the article identity. The information acquisition device then communicates the article identity to the control system, which is then able to compare the article identity to the database of orders that have been batched and assign a destination container for depositing the article based on the orders. The control system does this for each item until the orders are filled. The destination container can be positioned on the same platform or surface as the transport vehicle and the transport vehicle can deposit directly into the destination container.

Example 8

According to Example 1, an additional example utilizing the same or many of the components discussed in regard to Examples 1-7, the disclosed system comprises one or more removal devices configured to relocate a destination container. Particularly, the removal device is configured to relocate a destination container from a position below or alongside a platform as disclosed herein to a location designated for further processing of at least one article contained within the designation container.

Figure 7:
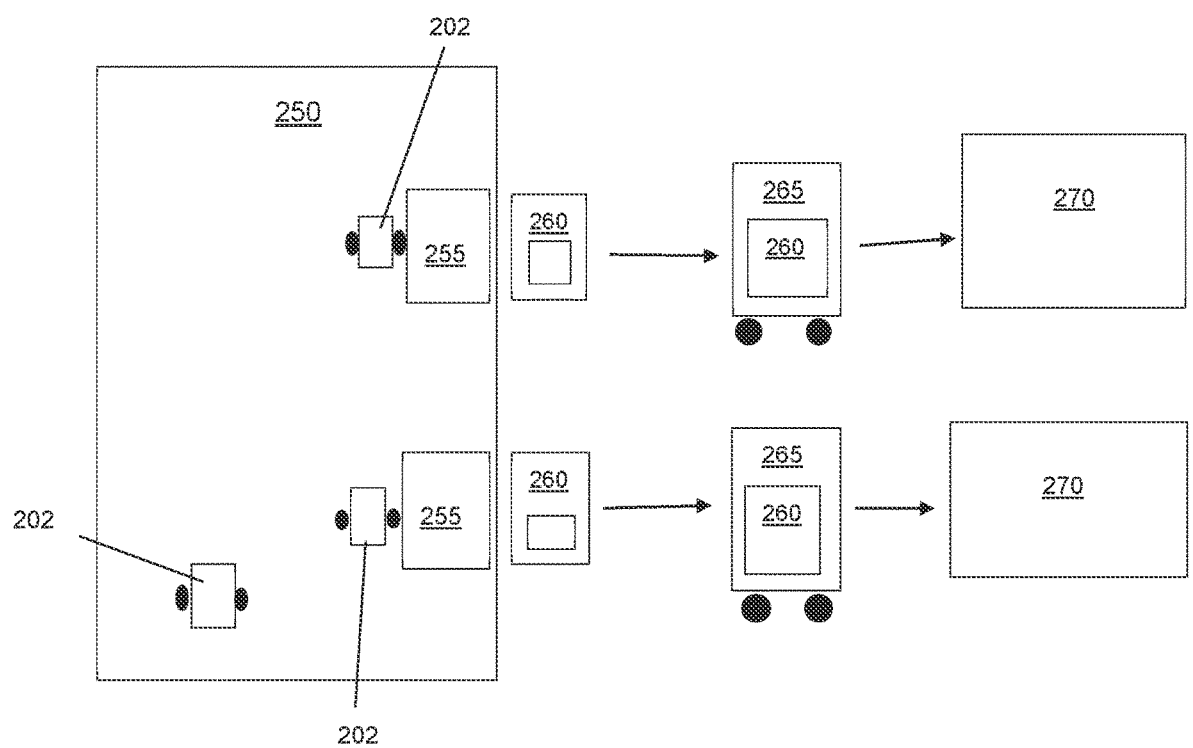
FIG. 7 is an illustration of a sorting system provided in accordance with some embodiments of the presently disclosed subject matter.

As illustrated in FIG. 7, the disclosed system can include platform 250 that extends from a first surface. The platform 250 defines one or more platform openings 255 through which articles are deposited into destination containers 260. One or more computer-controlled transport vehicles 202 traverse platform 250 and are configured to have a first position in which an article is stowed upon transport vehicle 202, and a second position in which the article is deposited into a destination container by manipulating a holder carried by transport vehicle 202. Transport vehicles 202 therefore function to deposit articles stowed thereon into destination containers positioned below an opening in the platform or alongside a position at the edge of the platform by manipulation of the transport vehicle first position to the second position. Accordingly, in use, one or more transport vehicles 202 traverse platform 250 and can be positioned proximal to platform opening 255. In some embodiments, the platform can include a chute or other mechanism that connects platform opening 255 and destination container 260 to guide the article into the destination container.

The system further includes removal device 265 configured to relocate destination container 260 from a position about the first surface (e.g., beneath a platform opening or alongside a location on the edge of the platform) to processing location 270 for further processing of an article contained within the destination container, as illustrated by Arrows A. The processing location can be configured for any desired processing of an article, including, but not limited to, packaging and value-added services such as labeling, gift wrapping, assembly, and the like. In some embodiments, the disclosed system can include a plurality of processing locations 270, and each destination container 260 can be transported via removal device 265 to one or more processing locations 270.

Removal device 265 can transport destination container 260 using any known method. For example, as shown in FIG. 7, in some embodiments, the removal device can include wheels or other mechanical elements to allow movement in a desired direction through any desired mechanism. However, the removal device is not limited and can include any device capable of moving across a surface. For example, in some embodiments, suitable removal devices can include, but are not limited to, automatic guided vehicles (AGVs), automated mobile robots, rail bots, semi-automated vehicles, and the like. In various embodiments, the removal device can be semi-automated or fully automated. In some embodiments, the removal device can include any computer-controlled or user-controlled device known or used in the art. In various embodiments, the removal device can relocate destination container 260 using any desired method. For example, the destination container 260 can be hauled, dragged, toted, carried, lifted, or otherwise moved to processing location 270.

The disclosed system further includes a control system. As set forth herein above, the control system is configured to receive an order for one or more disparate articles found within an article supply location after the articles have been pulled from a distribution center. The control system determines a destination container 260 to direct a transport vehicle to deposit a selected article based on the determined product type. The product type can be determined by interacting with an identifier of the article (e.g., UPC or other product code associated with the article) with an information acquisition device. The destination container 260 corresponds with an order for a business. The control system directs the transport vehicle 202 to transport the selected article to the destination container 260 and deposit the selected article by manipulation of the transport vehicle 202 from the first position to the second position. The destination container 260 can be positioned proximal to (e.g., beneath) an opening in a first platform.

The control system further determines processing location 270 that the destination container 260 is to be delivered to for further processing of at least one article in the container. Any known processing action can be performed at processing location 270. For example, the processing location can be configured for assembly of an item or order. In some embodiments, assembly can include grouping a plurality of items together to be shipped as a unit or as a single order. In some embodiments, assembly can include grouping together items that are to be shipped to a common location (e.g., zip code, city, or similar other attributes). An order or item can be manufactured or constructed into a final form during assembly (e.g., two portions of an order can be joined).

In some embodiments, processing location 270 can be configured for gift wrapping an order or article. Gift wrapping can include receiving and enclosing a gift in a decorative enclosure. In some embodiments, the gift wrapping can include covering the outside of the order or article in the decorative enclosure. In some embodiments, the gift wrapping can include packaging the order or article in a container (such as a box) and then gift wrapping the container. Gift wrapping can include the addition of a card or other element from the sender with a message, receipt, or a similar other piece of information. Gift wrapping at processing location 270 can be automated or semi-automated in some embodiments.

In some embodiments, processing location 270 can be configured to package an article or order. The term "package" as used herein refers to enclosing a particular article and/or order in a suitable container (e.g., box, envelope, padded mailer), such as for shipping. Packaging can further include the addition of filler materials to cushion the packaged item and prevent or eliminate damage. Suitable filler materials can include shipping peanuts, air cellular material, foam inserts, paper stuffing, paper shredding, and the like. In some embodiments, packaging can include the insertion of an order receipt, order form, return instructions, use instructions, packing list, and similar other attributes within the interior of the package to allow the receiver to ensure the entire order has been received. In some embodiments, packaging can include sealing the package, such as with tape, adhesive, and the like. Packaging at processing location 270 can be automated or semi-automated in some embodiments.

Processing location 270 can comprise labeling the order or article, such as after packaging has occurred. Suitable labeling can include information such as shipping data, return data, tracking number, date, shipping cost, and similar other attributes. In some embodiments, the labeling information can be printed directly onto the packaging or it can be affixed to the package exterior. The labeling can be automated or semi-automated.

The control system as disclosed herein directs removal device 265 to remove destination container 260 from the position proximal to the platform 250 and transport it to the determined processing location. The disclosed system can include a plurality of processing locations 270. Alternatively, a single processing location can be configured to perform more than one task (e.g., packaging and labeling). The control system can be configured to direct a plurality of removal devices 265 such that there are no collisions.

The control system can be further configured to determine when all of the articles required to complete at least one of the orders has been deposited into the destination container. The control system can send a notification that a particular order has been completed.

In some embodiments, the control system is further configured to indicate when the destination container is full or when the destination container is removed from its location so that the transport vehicle will not deliver articles to that location. The control system is further configured, and when an empty destination container is positioned proximal the platform, that the position can once again receive articles.

The control system is configured to indicate when the destination container is full or when the destination container has been removed whereby the control system directs a transport vehicle to cease delivery of articles to the removed destination container location. The control system is further configured to indicate when an empty destination container is positioned proximal to the platform whereby the control system directs the transport vehicle to resume delivery of articles to the empty destination container.

In some embodiments, the removal device also operates to replace destination containers that are full or that contain complete orders with empty destination containers.

In some embodiments, the control system can be configured to direct the transport vehicle to return to a position proximal the first article supply location after the article has been processed.

As to the above, they are merely specific embodiments of the presently disclosed subject matter. However, the scope of protection is not limited thereto, and within the disclosed technical scope, any modifications or substitutions that a person skilled in the art could readily conceive of should fall within the scope of protection of the presently disclosed subject matter. Thus, the scope of protection shall be determined by the scope of protection of the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A system comprising:
  a self-propelled computer-controlled transport vehicle for transporting an article along a platform to a position proximal a destination container;
  a computer-controlled removal device for relocating destination containers from an article receiving position to a location designated for further processing of the article contained within the destination containers;
  a control system comprising a memory and a processor, wherein the processor is configured to:
    receive an order for a plurality of disparate articles, wherein the disparate articles are found within an article supply location;
    determine a first destination container among a plurality of destination containers to direct the transport vehicle to deposit a selected article from an article supply location based on a determined product type;
    direct the transport vehicle to transport the selected article to the first destination container and deposit the selected article in the first destination container;
    determine a location that the first destination container is to be delivered to for further processing of the selected article in the first destination container;
    determine when to cease delivery of articles to the first destination container;
    direct, in response to the determination to cease delivery to the first destination container, a removal device to transport the first destination container to the location of further processing determined by the control system,
    wherein the removal device operates to relocate the first destination container from a position alongside an edge of the platform to the location of further processing,
    wherein the further processing comprises assembling of the plurality of the articles;
    wherein the control system is further configured to indicate when the destination container has been removed.

2. The system of claim 1, wherein the processor is further configured to direct the transport vehicle to resume delivery of articles to a second destination container.

3. The system of claim 1, wherein the first destination container corresponds with a first order.

4. The system of claim 1, wherein the removal device comprises a forked lifting device.

5. The system of claim 1, wherein the removal device is fully automated or semi-automated.

6. The system of claim 1, wherein the transport vehicle is a rail robot.

7. The system of claim 1, wherein the system further comprises a plurality of locations of further processing.

8. The system of claim 1, wherein the processor is further configured to direct the transport vehicle to traverse the platform proximal the first destination container, then manipulate from a first position to a second position to deposit the selected article into the first destination container.

9. The system of claim 1, wherein the transport vehicle is configured to carry a respective single selected article at a time.

10. The system of claim 1, wherein the transport vehicle is configured to carry a plurality of articles at a time.

11. The system of claim 1, wherein the processor is further configured to receive a plurality of orders for a plurality of disparate articles, and batch the plurality of orders over a period of time.

12. The system of claim 1, wherein the processor is further configured to interact with an identifier affixed to a selected article or packaging associated with the selected article to determine a product type of the selected article at the article supply location.

13. The system of claim 1, wherein the processor is further configured to direct the removal device to replace destination containers that are full with empty destination containers.

14. The system of claim 1, wherein the processor is further configured to direct a manual replacement of destination containers that are full with empty destination containers.

15. The system of claim 1, wherein the removal device is one of: fully automated, semi-automated, computer-controlled, and user-controlled.

16. The system of claim 1, wherein the control system is configured to direct a plurality of additional transport vehicles, wherein the control system is further configured to direct the plurality of additional transport vehicles such that the plurality of additional transport vehicles does not collide with one another.

17. The system of claim 1, wherein the determined product type of the selected article is determined by interacting with an identifier of the selected article with an information acquisition device.

18. The system of claim 17, wherein the identifier is a UPC (Universal Product Code) or other product code associated with the selected article.

19. The system of claim 1, wherein the processor is further configured to direct the transport vehicle to return to a position proximal the article supply location.

20. The system of claim 19, wherein the transport vehicle is configured to be in the first position upon being positioned proximal the article supply location.

* * * * *